(12) United States Patent
Ledermann et al.

(10) Patent No.: US 9,211,787 B2
(45) Date of Patent: Dec. 15, 2015

(54) METHOD FOR CALIBRATING EXHAUST GAS PROBES AND FUEL DOSING DEVICES IN A HYBRID VEHICLE

(71) Applicants: Bernhard Ledermann, Weil der Stadt (DE); Andreas Michalske, Kornwestheim (DE); Christian Horn, Esslingen (DE); Klaus Theiss, Altheim (DE); Bernhard Matrohs, Ebersbach (DE)

(72) Inventors: Bernhard Ledermann, Weil der Stadt (DE); Andreas Michalske, Kornwestheim (DE); Christian Horn, Esslingen (DE); Klaus Theiss, Altheim (DE); Bernhard Matrohs, Ebersbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/376,583

(22) PCT Filed: Jan. 29, 2013

(86) PCT No.: PCT/EP2013/051621
§ 371 (c)(1),
(2) Date: Aug. 4, 2014

(87) PCT Pub. No.: WO2013/117455
PCT Pub. Date: Aug. 15, 2013

(65) Prior Publication Data
US 2015/0142231 A1    May 21, 2015

(30) Foreign Application Priority Data

Feb. 6, 2012  (DE) .......................... 10 2012 201 670
Jan. 28, 2013 (DE) .......................... 10 2013 201 316

(51) Int. Cl.
*B60K 6/46* (2007.10)
*B60W 10/06* (2006.01)
(Continued)

(52) U.S. Cl.
CPC ... *B60K 6/46* (2013.01); *B60K 6/48* (2013.01); *B60W 10/06* (2013.01); *B60W 10/08* (2013.01);
(Continued)

(58) Field of Classification Search
CPC ...... B60K 6/46; B60W 20/108; B60W 10/06; B60W 20/20; B60W 2030/1809
USPC ........................................................ 701/22
See application file for complete search history.

(56) References Cited

U.S. PATENT DOCUMENTS

| 2011/0071749 A1* | 3/2011 | Burkhardt et al. ............ 701/108 |
| 2011/0082608 A1* | 4/2011 | Becker et al. ................... 701/22 |
| 2011/0118923 A1* | 5/2011 | Zeh et al. ........................ 701/22 |

FOREIGN PATENT DOCUMENTS

| DE | 199 45 618 | 3/2001 |
| DE | 100 23 072 | 11/2001 |

(Continued)

OTHER PUBLICATIONS

International Search Report for PCT/EP2013/51621, dated Aug. 1, 2013.

*Primary Examiner* — Mary Cheung
*Assistant Examiner* — Anne Mazzara
(74) *Attorney, Agent, or Firm* — Kenyon & Kenyon LLP

(57) ABSTRACT

In a method for calibrating a measuring signal of an exhaust gas probe or a control signal of a fuel dosing device of a vehicle equipped with a hybrid drive including an internal combustion engine and at least one electric motor, the vehicle being able to be driven also by an electric motor exclusively, the gas transport for calibrating the signal of the exhaust gas probe or the fuel dosing device is induced by an engine drag operation of the vehicle, in which the internal combustion engine is dragged by the at least one electric motor while the fuel supply is deactivated.

14 Claims, 1 Drawing Sheet

(51) Int. Cl.
   *B60W 10/08*    (2006.01)
   *B60W 20/00*    (2006.01)
   *B60K 6/48*     (2007.10)
   *F02D 41/24*    (2006.01)
   *F02D 41/12*    (2006.01)
   *F02D 41/14*    (2006.01)
   *B60W 30/18*    (2012.01)

(52) U.S. Cl.
   CPC ............. *B60W 20/00* (2013.01); *B60W 20/108* (2013.01); *B60W 20/20* (2013.01); *F02D 41/2441* (2013.01); *B60W 2030/1809* (2013.01); *F02D 41/123* (2013.01); *F02D 41/146* (2013.01); *F02D 41/1454* (2013.01); *F02D 41/2467* (2013.01); *F02D 41/2474* (2013.01); *Y02T 10/6221* (2013.01); *Y02T 10/6286* (2013.01)

(56) References Cited

FOREIGN PATENT DOCUMENTS

| | | |
|---|---|---|
| DE | 10 2008 010102 | 8/2009 |
| DE | 10 2008 000911 | 10/2009 |
| DE | 10 2010 041311 | 3/2012 |
| WO | WO 2008/071500 | 6/2008 |

\* cited by examiner

METHOD FOR CALIBRATING EXHAUST GAS PROBES AND FUEL DOSING DEVICES IN A HYBRID VEHICLE

BACKGROUND OF THE INVENTION

1. Field of the Invention

The present method relates to a method and a program for calibrating a measuring signal of an exhaust gas probe or a control signal of a fuel dosing device of a vehicle equipped with a hybrid drive including an internal combustion engine and at least one electric motor, the vehicle also being able to be driven by an electric motor alone.

2. Description of the Related Art

Modern motor vehicles usually have one or more exhaust-gas sensors disposed in the exhaust duct, which emit a measuring signal that is proportional to the concentration of at least one exhaust-gas component and allows its concentration to be determined. Prevalent are what is referred to as broadband lambda probes, whose measuring signal supplies information about the oxygen concentration in the exhaust gas, and thus about the air-fuel ratio supplied to the internal combustion engine. Likewise known are so-called $NO_x$ sensors, which are also able to determine the oxygen concentration in the exhaust gas. To obtain reliable measuring accuracy, such probes in the vehicle must be adjusted or calibrated on a regular basis. Such a calibration usually takes place when the vehicle is in a trailing throttle mode. The trailing throttle mode is characterized by the fact that no fuel is injected, yet the vehicle continues its movement due to its inertia and drags the internal combustion engine along in the process. Depending on the position of the control elements for controlling the air supply, the dragged internal combustion engine supplies pure air having a known oxygen concentration into the exhaust gas system in this trailing throttle mode. Following a certain purging period, pure air is therefore present at the installation location of the exhaust gas sensor to be calibrated. An oxygen concentration, measured with the aid of a lambda probe, for instance, is then compared to the known oxygen concentration of the air and a correction value is calculated therefrom, which is used to correct the measured value of the lambda probe in the subsequent operation. In a similar manner, corrective functions of other sensors take place in a trailing throttle operating mode.

Furthermore, from published German patent application document DE 199 45 618 A1 a method is known for calibrating fuel dosing devices, in which the control signal of a fuel dosing device is increased in a trailing throttle operating mode until a measured oxygen concentration drops below the known oxygen concentration of air. In this way the minimum signal strength that is required to induce the fuel dosing device to inject a recognizable fuel quantity is determined, and a corrective value is calculated therefrom, which is used in the subsequent operation to correct the control signal of the fuel dosing device.

In the case of hybrid vehicles, such an adjustment is problematic. Hybrid vehicles are motor vehicles in which at least two drive units are combined with each other. For example, known hybrid vehicles use internal combustion engines and electric machines simultaneously.

In the context of the present invention, a hybrid drive of a vehicle in particular refers to a drive of a vehicle that encompasses at least one combustion engine and furthermore one electric motor, in which case the electric motor is also able to drive the vehicle by itself, i.e., without active or passive participation of the combustion engine.

Within the meaning of the present invention, hybrid drives in particular differ from conventional drives which are equipped with a combustion engine and only an electric starter or starter motor. In such drives the electric starter or starter motor is set up merely to drag the combustion engine. In other words, to the extent that a mechanical action of the electric starter or starter motor on the drive of the vehicle is conceivable, this action merely consists of dragging the internal combustion engine, in the presence of additional mechanical coupling of the internal combustion engine to the drive of the vehicle. Direct mechanical coupling of the electrical starter or starter motor to the drive of the vehicle that does not include the internal combustion engine does not take place, however. In these types of drives the vehicle is therefore unable to be driven solely by the electric starter or starter motor; instead, a mechanical action takes place indirectly at best, transmitted by the internal combustion engine.

The properties of internal combustion engines and electric machines advantageously complement one another in a hybrid vehicle. Especially preferred these days are so-called parallel hybrid concepts, in which the vehicle drive is able to be represented both by the internal combustion engine and the electric motor(s) simultaneously. In addition, there are also so-called series hybrid concepts, in which the driving of the vehicle takes place via one or more electric motor(s) exclusively, while the internal combustion engine generates the electrical current for recharging an energy store via a separate generator, the electric current then supplying the electric motor(s). The current may also be supplied directly to the electric motor(s). A trailing throttle operation is usually not desired in hybrid vehicles of this type. Instead, when no torque is required, the internal combustion engine is meant to be decoupled from the drive train, and the internal combustion engine is to be restarted when required. In this respect, it is even problematic to generate a trailing throttle operation in such hybrid vehicles. Especially problematic, however, is to provide a trailing throttle operation of sufficient length. For if the trailing throttle operation is activated only when needed, for instance by means of a trailing throttle coordinator, then the problem is encountered that the trailing throttle phase must have a certain minimum length for the lambda probe adjustment, and also for other adjustment functions. Since the duration of the trailing throttle phase is not known in advance, the coordinator often requests the trailing throttle although the ensuing trailing throttle phase does not have the desired length and consequently is unable to be utilized. This in turn worsens the energetic overall efficiency of the hybrid vehicle.

BRIEF SUMMARY OF THE INVENTION

In contrast, the method of the present invention has the advantage that an adjustment of exhaust gas probes or fuel dosing devices is able to be performed independently of a trailing throttle operating mode. For this purpose, the present invention provides that the gas transport for calibrating the measuring signal of the exhaust gas probe or the control signal of the fuel dosing device is induced by an engine drag operation of the vehicle, in which the vehicle is driven exclusively by the electric motor, and the internal combustion engine is dragged by the at least one electric motor. This operating state is what is meant by 'engine drag operation' in the present invention. This allows an adjustment or a calibration of the exhaust-gas probe or the fuel dosing device in which pure air has to be present in the exhaust gas system of the internal combustion engine independently of the trailing throttle.

One advantageous further refinement of the method provides that the engine drag operation is selected during the purely electric driveaway of the vehicle. In this case the electric motor drives the internal combustion engine in the engine drag mode during the driveaway and supplies pure air into the exhaust gas system in the process. The adjustment of the exhaust gas probe or the fuel dosing device is able to take phase in this engine drag operating state.

Another development of the method provides that the engine drag operation is at least partially selected during an already existing trailing throttle operation, in which the fuel supply of the internal combustion engine is switched off and the operation of the internal combustion engine thus is maintained only by the vehicle, which is moving solely as a result of mass inertia while the gear is engaged. This method variant requires the presence of a trailing throttle operation. However, if the trailing throttle phase turns out to be too short, the usable time period for the adjustment function is able to be prolonged by the operating mode of the present invention, so that the trailing throttle phase is usable nonetheless. To do so, a torque request during the trailing throttle phase is "covered" by the connected electric motor, i.e., the internal combustion engine is not required to supply the torque in this state. The trailing throttle operation is thereby prolonged, so to speak.

In addition to such an extension of the trailing throttle operation, it may also be provided that an engine drag operation takes place during the entire trailing throttle operation. In this case, the trailing throttle operation is generally able to be prolonged even before a torque demand requested by the driver is signaled. Furthermore, in another advantageous development, the trailing throttle functions are executed when the vehicle is operated purely electrically at low speed using the hybrid drive, i.e., especially also when the driver actuates neither the accelerator nor the brake pedal, so that the vehicle is creeping, so to speak, in electromotive manner.

Although the vehicle is able to be driven by an electric motor exclusively, the method of the present invention in further developments requires only that the calibration also takes place while the vehicle is actually driven solely by this one electric motor. In other further developments, the calibration may also take place while the vehicle is not driven, that is to say, while the vehicle is standing, for example, and/or during coasting, during a forward movement, and/or during idling of the internal combustion engine and/or in a stop phase of a start-stop system. Essential is merely that the internal combustion engine is dragged in electromotive manner while the fuel supply is switched off.

Although the electromotive dragging may be done by the electric motor with whose aid the vehicle is also drivable on its own, this is only one possible option, which also is the preferred option in parallel hybrids.

An alternative, however, and actually preferred if series hybrids are involved, is that the electric motor that is also able to drive the vehicle by itself, not be the at least one electric motor that is used for the electromotive dragging, but rather another electric motor. For series hybrids it is furthermore preferred if the generator provided in connection with this concept and usually driven by the internal combustion engine during the standard operating mode of the vehicle in order to generate current, for example to charge a battery, is operated as an electric motor during the calibration and drags the internal combustion engine.

This being the case, the electric motor by which the vehicle is also able to be driven on its own may be referred to as the first electric motor, and the at least one electric motor that drags the internal combustion engine when the fuel supply is switched off, may also be referred to as the second electric motor. The electric motors thereby designated as first and second electric motor may be realized by one and the same electric motor, but this need not necessarily be the case.

In another advantageous further refinement of the method, the internal combustion engine is dragged only until pure fresh air is available at the location of the exhaust gas sensor to be adjusted. The actual adjustment of the measuring signal may then be performed while the internal combustion engine is stationary, since no further gas exchange is required at the location of the exhaust gas sensor. The dragging operation need therefore not be continued during the actual adjustment, which further increases the energetic overall efficiency.

In the case of an exhaust gas probe developed as a lambda probe, the pump current is not maintained in every standstill phase of the internal combustion engine; instead, it is enabled only in case of a calibration or an adaptation of the probe in order to avoid damage to the probes.

These different method variants are advantageously used only if there is indeed a need for an air adaptation. If no such need is present, it is possible to dispense with the engine drag operation in order to save energy.

DETAILED DESCRIPTION OF THE INVENTION

The core idea of the present invention is to allow not only the electrical operation of a hybrid vehicle, during which the internal combustion engine is decoupled from the drive train, but also another mode in which the internal combustion engine is dragged by the electric motor. This will be referred to as engine drag operation in the following text. In this case, just like in a trailing throttle mode, which is characterized by the fact that the fuel supply is switched off in this operating mode, pure air is transported through the internal combustion engine, thereby providing the opportunity for implementing an afore-described adaptation or a calibration of a lambda probe, for example. It should be pointed out in this context that the method is suitable not only for the trailing throttle adjustment of lambda probes, but may basically be provided for all sensor or adjustment functions, in which the presence of air in the exhaust gas tract is a prerequisite. In particular, the method is also usable for adapting the oxygen signal of $NO_x$ sensors. A calibration of fuel dosing devices, as can be gathered from DE 199 45 618 A1, for example, especially the specific embodiment having a lambda probe, is another potential application case. The variants of the method of the present invention as described in the following text may especially advantageously be used when a startup of the internal combustion engine is to be expected following the engine drag operation. For if the internal combustion engine has already been accelerated by the drag operation, correspondingly less energy is required for the starting operation.

Figure 1:
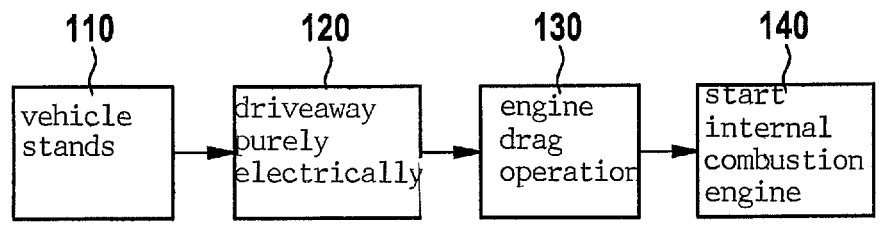
FIG. 1 shows a first development of the method according to the present invention.

FIG. 1 schematically shows a first variant of the method of the present invention in the form of a block diagram. The vehicle is at a standstill in an operating state 110. Subsequently, a purely electrical power take-off takes place in an operation 120. "Purely electrical" means that the vehicle is driven solely with the aid of at least one electric motor. In a state 130, an engine drag operation takes place, in which the internal combustion engine is dragged by the at least one electric motor. The adjustment of the lambda probe takes place in this particular operating state. In a further operating state 140, the internal combustion engine is started up. This start-up takes place after the adjustment of the lambda probe has been concluded.

As an alternative, the internal combustion engine and the drive of the vehicle could also be decoupled. In contrast to the above, a power take-off of the vehicle during the engine drag operation would therefore be omitted.

Figure 2:
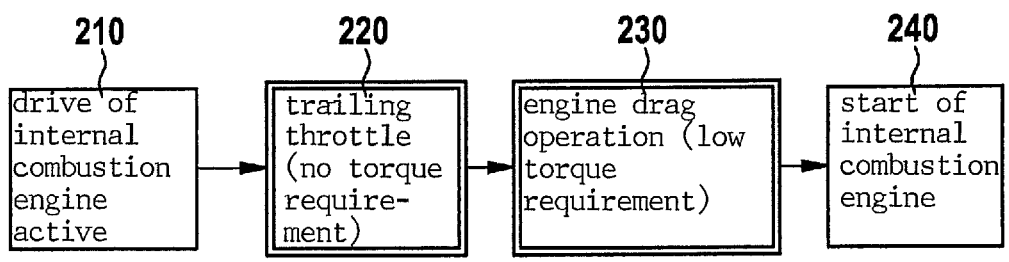
FIG. 2 shows a further variant of the method of the present invention.

FIG. 2 shows another further development of the method of the present invention, using a block diagram. A block 210 denotes the driving state of the vehicle in which the internal combustion engine is active. In a state 220, a trailing throttle operation of the internal combustion engine occurs. The trailing throttle operation is characterized by the fact that no torque requirement exists. If the trailing throttle phase turns out to be too short because torque is required, this torque requirement is initially covered by the at least one connected electrical motor and the period for a lambda probe adjustment is extended in this manner. In this case an engine drag operation takes place. This state is designated by reference numeral 230 in FIG. 2. The start of the internal combustion engine then takes place in operating state 240. As an alternative to this variant, it may basically be provided to connect the electrical motor(s) in a trailing throttle operation in general so as to prolong the trailing throttle phase even before the driver signals a torque requirement.

Furthermore, in yet another development of the method, the trailing throttle functions are executed when the hybrid vehicle is driven electrically at a minimum speed, i.e., especially also when the driver actuates neither the accelerator nor the brake pedal, so that the vehicle is creeping, so to speak, in electromotive manner.

Figure 3:
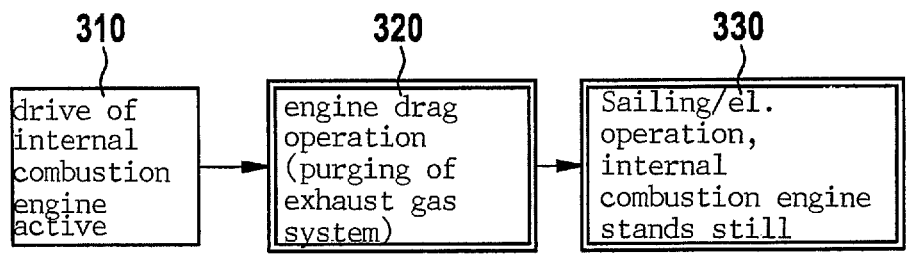
FIG. 3 shows still another variant of the method of the present invention.

In another advantageous further refinement of the method, the internal combustion engine is dragged only until pure fresh air is available at the location of the exhaust gas sensor to be adjusted. This is illustrated schematically in FIG. 3. In a step 310, the vehicle is initially driven by the internal combustion engine. The engine drag operation then follows in that purging of the exhaust gas system is implemented in step 320. As soon as this purging of the exhaust gas system has been concluded, either a purely electrical operation or so-called "sailing" takes place in a further operating state, in which the internal combustion engine continues to be deactivated ("stands") (step 330). The actual adjustment of the measuring signal may then be performed while the internal combustion engine is at standstill, since no further gas exchange is required at the location of the exhaust gas sensor. The drag operation need therefore not be continued during the actual adjustment, which further increases the energetic overall efficiency.

If the calibration of a broadband lambda probe is performed, the pump current of this broadband lambda probe will furthermore not be maintained in every standstill phase of the internal combustion engine; instead it will be enabled once the criteria for a calibration have been satisfied, so that damage to the probe is avoided. The enabling of the pump current of the broadband lambda probe thus takes place as a function of the calibration request.

It should be stressed that all variants of the afore-described method are used only if the need for an air adjustment actually exists. If no such need exists, it is possible to dispense with the engine drag operation in order to save energy.

The afore-described method may basically be provided for the trailing throttle adjustment of lambda probes. However, it may also be used for other sensor and adjustment functions in which air in the exhaust tract is a prerequisite. For example, it may also be used for adjusting the oxygen signal of $NO_x$ sensors or in the calibration of fuel dosing devices with the aid of lambda probes, as they are described in the German patent DE 199 45 618 A1, for example.

Purely as a matter of principle, the afore-described method is realizable as a computer program product and may be implemented on the control unit of the hybrid vehicle and run there. The program code may be stored on a data storage device or a mobile computer or the like and be read into the control unit.

What is claimed is:

1. A method for calibrating a measuring signal of an exhaust gas probe of a vehicle equipped with a hybrid drive having an internal combustion engine and at least one electric motor, wherein the vehicle is able to be selectively driven exclusively by the at least one electric motor, comprising:
   inducing, by an engine drag operation of the vehicle, a gas transport for calibrating the measuring signal of the exhaust gas probe, wherein in the engine drag operation, the internal combustion engine is dragged by the at least one electric motor while the fuel supply is switched off.

2. The method as recited in claim 1, wherein the gas transport for calibrating the measuring signal of the exhaust gas probe is induced by the engine drag operation in which the vehicle is driven by the electric motor exclusively.

3. The method as recited in claim 1, wherein the engine drag operation is selected during a purely electrical power pick-up of the vehicle.

4. The method as recited in claim 1, wherein the engine drag operation is selected at least partially during a trailing throttle operation in which the fuel supply of the internal combustion engine is switched off.

5. The method as recited in claim 4, wherein the trailing throttle operation is prolonged by the engine drag operation.

6. The method as recited in claim 4, wherein the engine drag operation takes place during the entire trailing throttle operation.

7. The method as recited in claim 1, wherein the engine drag operation is selected during a driving state of the vehicle in which the vehicle is driven without (i) an accelerator operation by a driver and (ii) a brake pedal operation by a driver.

8. The method as recited in claim 1, wherein the engine drag operation takes place while the vehicle is standing.

9. The method as recited in claim 1, wherein the engine drag operation takes place in at least one of (i) after-running operation of the internal combustion engine, (ii) forward moving operation of the internal combustion engine, (iii) idling operation of the internal combustion engine, and (iv) a stop phase of a start-stop system.

10. The method as recited in claim 1, wherein the hybrid drive is a series hybrid drive and the at least one electric motor which drags the internal combustion engine differs from the electrical motor which is able to drive the vehicle also by itself.

11. The method as recited in claim 1, wherein the internal combustion engine is dragged only until pure fresh air is present at a location of the exhaust gas probe, and calibration of the measuring signal of the exhaust gas probe is then performed while the internal combustion engine is stationary.

12. The method as recited in claim 11, wherein in the case of the exhaust gas probe configured as a lambda probe, a pump current of the lambda probe is enabled only in the case of calibration.

13. The method as recited in claim 11, wherein at least one of a signal of a lambda sensor and an oxygen signal of a NOx sensor takes place.

14. A non-transitory, computer-readable data storage medium storing a computer program having program codes which, when executed on a computer, performs a method for calibrating a measuring signal of an exhaust gas probe of a vehicle equipped with a hybrid drive having an internal combustion engine and at least one electric motor, wherein the vehicle is able to be selectively driven exclusively by the at least one electric motor, the method comprising:
    inducing, by an engine drag operation of the vehicle, a gas transport for calibrating the measuring signal of the exhaust gas probe, wherein in the engine drag operation, the internal combustion engine is dragged by the at least one electric motor while the fuel supply is switched off.

\* \* \* \* \*